Feb. 21, 1967    C. W. STETTER    3,305,088
INVERTED CAN AND TEST CAN DETECTING DEVICE
Filed Jan. 7, 1964    4 Sheets-Sheet 1
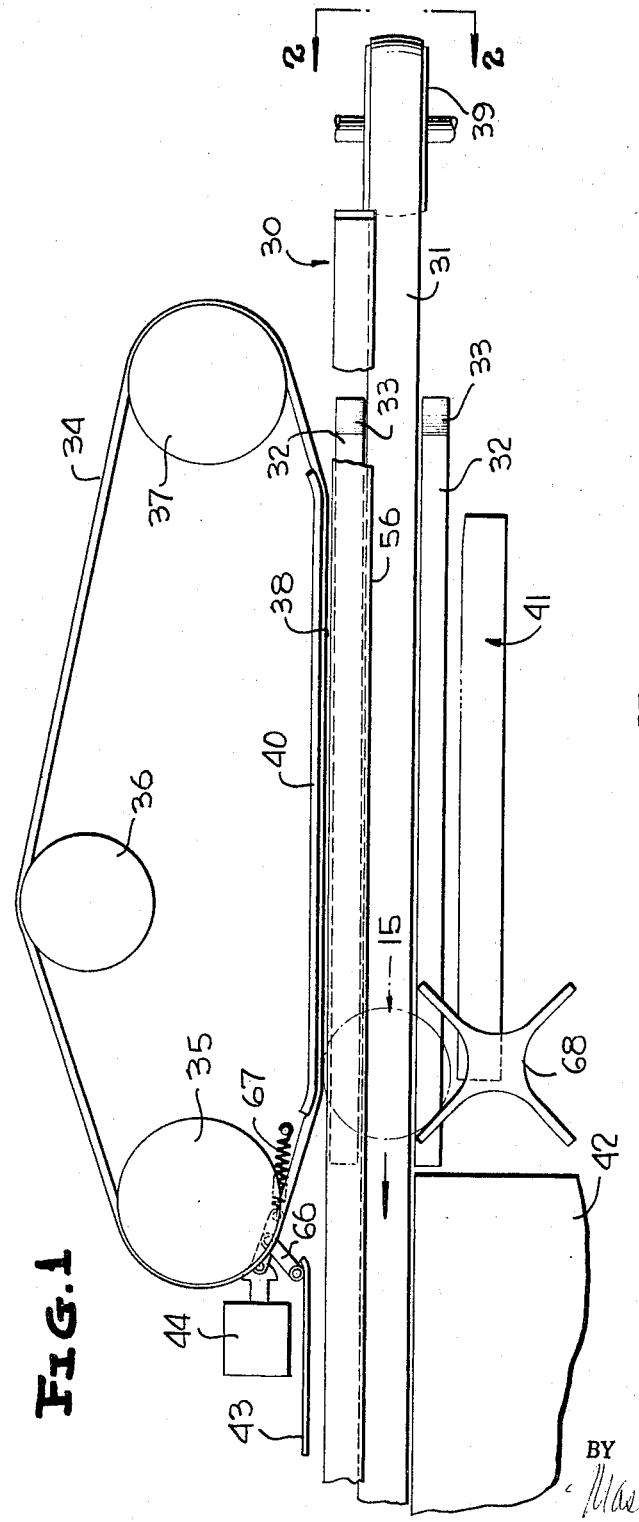
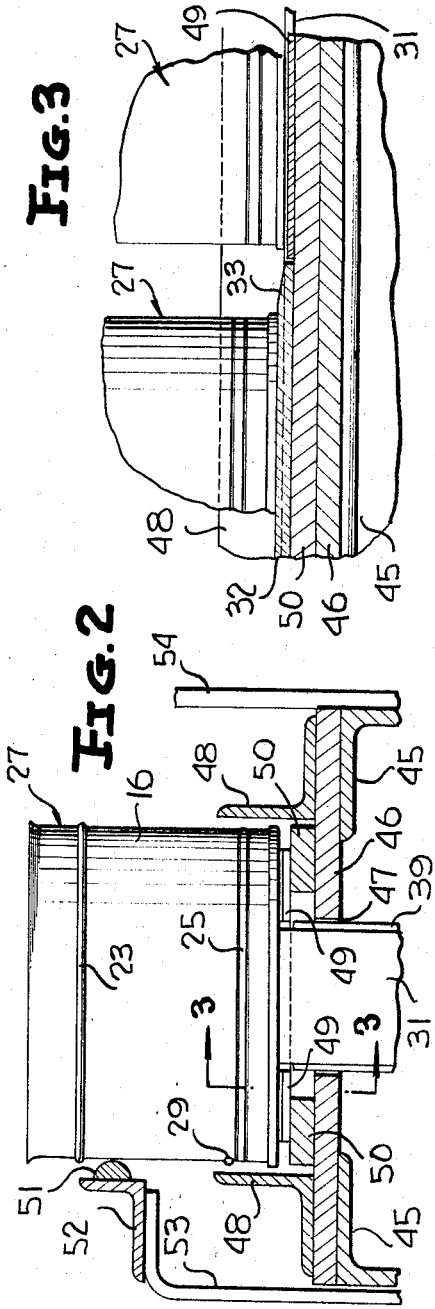
INVENTOR
CHARLES W. STETTER
BY
ATTORNEYS

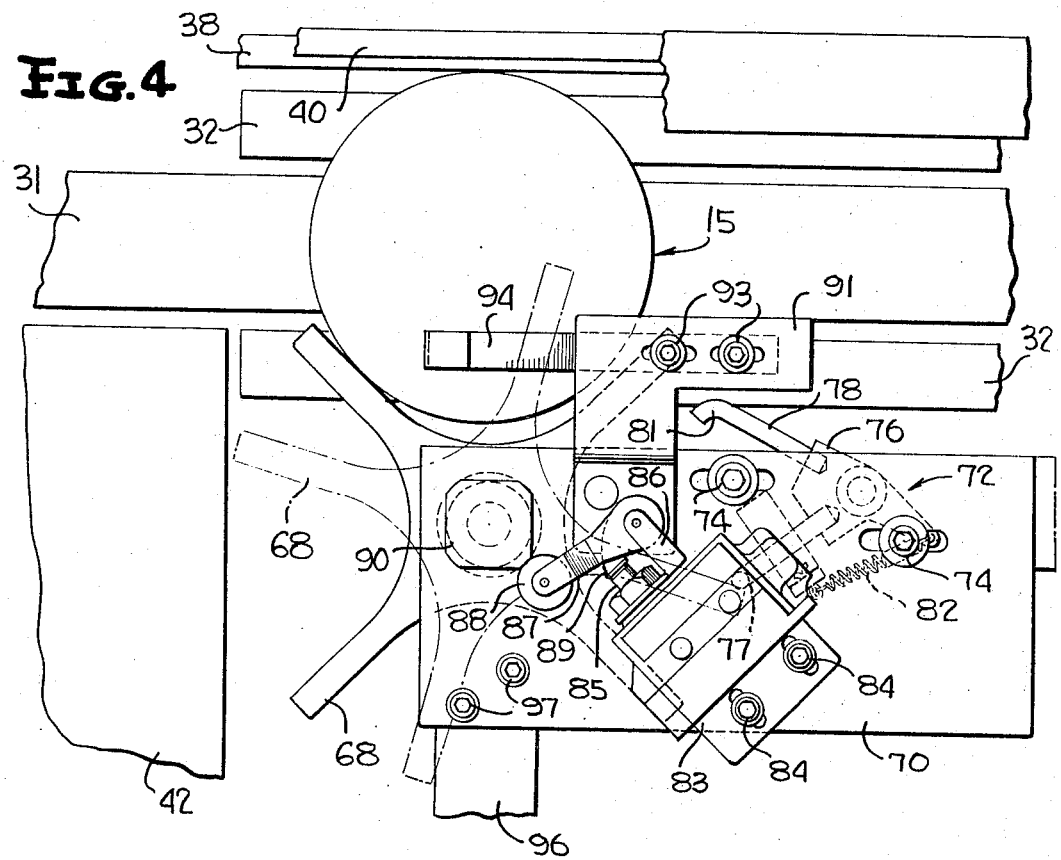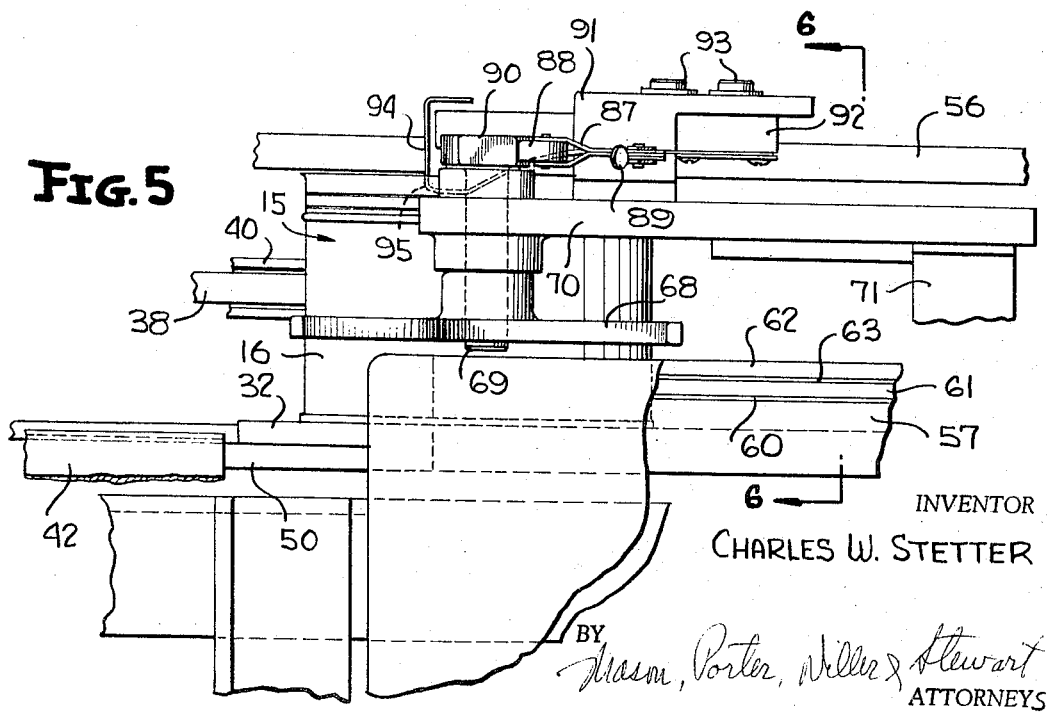

Feb. 21, 1967    C. W. STETTER    3,305,088
INVERTED CAN AND TEST CAN DETECTING DEVICE
Filed Jan. 7, 1964    4 Sheets-Sheet 3
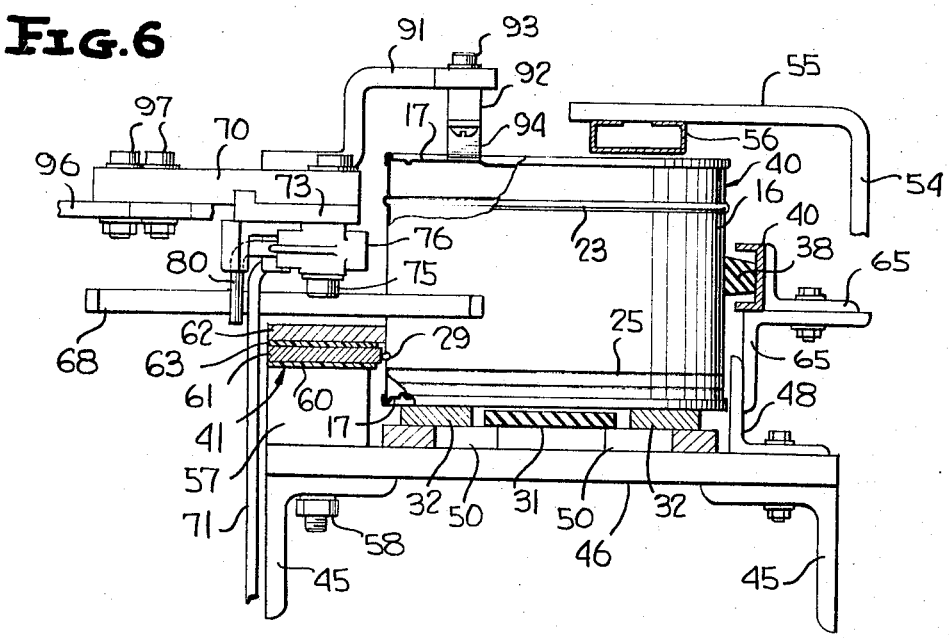
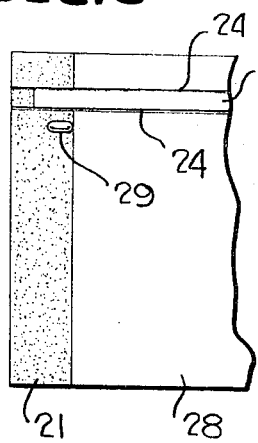
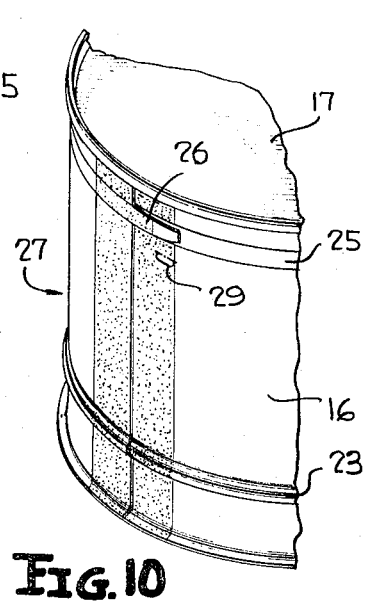
INVENTOR
CHARLES W. STETTER
BY
Mason, Porter, Diller & Stewart
ATTORNEYS

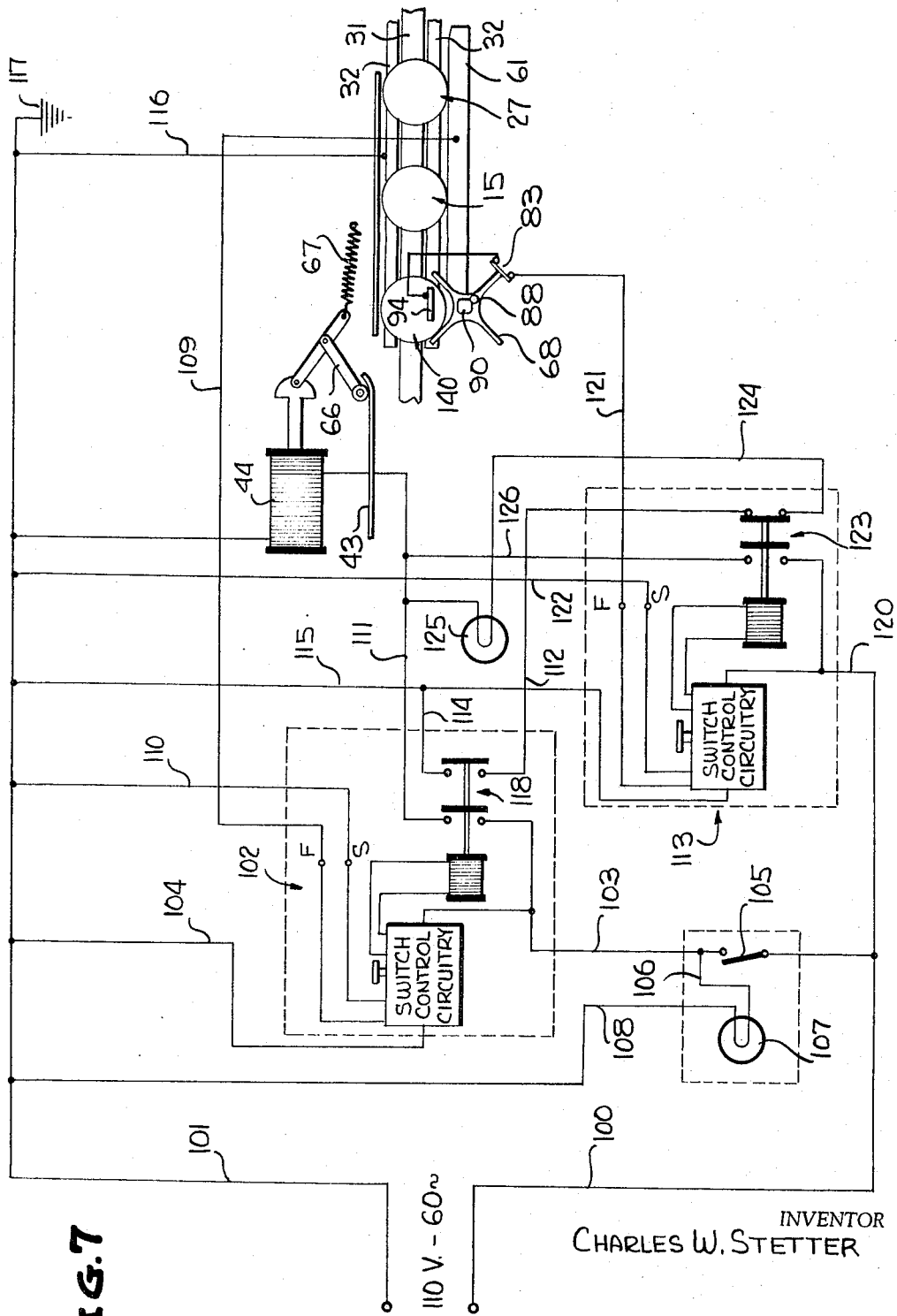

United States Patent Office 3,305,088
Patented Feb. 21, 1967

3,305,088
INVERTED CAN AND TEST CAN DETECTING DEVICE
Charles W. Stetter, Fair Lawn, N.J., assignor to Continental Can Company, Inc., New York, N.Y., a corporation of New York
Filed Jan. 7, 1964, Ser. No. 336,229
12 Claims. (Cl. 209—73)

This invention relates in general in new and useful improvements in machinery for the manufacture of cans and like containers, and more particularly relates to a novel detecting device for detecting cans traveling along a conveyor in an inverted position.

This invention primarily relates to apparatus for use in detecting improperly oriented collar cans. In the formation of a collar can, a flat blank is first formed, after which it is fed to a body maker for the shaping of the flat blank into cylindrical form. After the formation of the can body, a bottom end is placed thereon and a circumferential bead is formed around the upper part of the can body immediately adjacent the usual rip strip thereof for the purpose of retaining the usual collar within the upper portion of the can in alignment with the rip strip. However, occasionally, the can body is fed to an end applying machine in an inverted position whereby in lieu of the end being secured to the lower end of the can body, it is applied to the upper end of the can body. Also, when the can body is improperly oriented, the beading takes place adjacent the lower end thereof instead of adjacent the rip strip. It is the purpose of this invention to detect such improper oriented cans at the stage wherein one end has been applied thereto and the can body has been beaded.

It has been found that an inverted can may be more readily detected if the can body thereof is provided with a projection at a predetermined distance from an associated end of the can body. However, it is undesirable if such a projection exists in the final can in that it detracts from the appearance of the can. It is, therefore, the primary object of this invention to provide an improved apparatus for detecting a can with a projection which, if the can is not properly oriented at the time the can body is beaded, will continue to exist and will be in position for detection by a detecting device.

Another object of this invention is to provide a conveyor unit having means associated therewith for detecting improperly oriented cans, the conveyor unit including a primary conveyor belt for transporting cans and there being associated with a central portion of the primary conveyor belt rails for elevating cans out of engagement with the primary conveyor belt, and a secondary conveyor belt for engaging the periphery of cans to effect the rotation thereof and movement of the same along the rails with the secondary belt holding lower portions of cans in engagement with detecting bars whereby improperly oriented cans may be readily detected by a detecting system connected to the detecting rails.

Still another object of this invention is to provide in conjunction with a device for detecting improperly oriented containers a test device wherein test cans may be periodically inserted in the line of containers being tested for orientation whereby the test can will indicate when the detector is not properly functioning.

The use of test cans with detecting devices of the type to which this invention relates has posed a major problem in that when a test can is run through the detecting mechanism and the detecting mechanism is not functioning, the test can continues along the conveying line with the conventional cans and it becomes necessary to retrieve such test can. Accordingly, it is a further object of this invention to provide in conjunction with a detecting device for improperly oriented containers of the type having a container discharge mechanism, a detecting device for test cans which will operate the discharge mechanism independently of the means for detecting improperly oriented containers to assure the ejection of the test can irrespective of the functioning of the can orientation detecting means.

Still another object of this invention is to provide means for detecting and discharging test cans passing through an apparatus for detecting improperly oriented cans wherein the can orientation detector includes a can discharge mechanism, the test can detecting and discharge mechanism including a star wheel wherein one can at a time passes a predetermined point in spaced relation to other cans, and there is positioned at the star wheel means which will detect test cans and not necessarily detect improperly oriented cans whereby the detection of the test cans independently of the detection of improperly oriented cans is assured and test cans are positively ejected from the line of cans being detected for orientation.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic plan view showing generally the details of the means for controlling the movement of cans being detected in accordance with this invention.

FIGURE 2 is an enlarged fragmentary vertical sectional view taken along the line 2—2 of FIGURE 1 and shows the specific manner in which a can is advanced into the detection area of the unit.

FIGURE 3 is an enlarged fragmentary longitudinal sectional view taken along the line 3—3 of FIGURE 2 and shows the manner in which cans being fed into the detection area are elevated with respect to a primary conveyor belt.

FIGURE 4 is an enlarged fragmentary plan view of the detection apparatus and shows the specific details of the means for controlling the movement of cans and assuring the detection of test cans to effect the automatic ejection thereof.

FIGURE 5 is an enlarged elevational view of the apparatus shown in FIGURE 4 and shows further the details thereof.

FIGURE 6 is an enlarged transverse vertical sectional view taken along the line 6—6 of FIGURE 5 and shows a test can in position and being detected by the detection apparatus.

FIGURE 7 is a schematic view including a wiring diagram of the detection apparatus.

FIGURE 8 is a fragmentary plan view of a blank for forming a can body, the blank incorporating a projection by means of which an improperly oriented can may be ascertained.

FIGURE 9 is a fragmentary perspective view of a properly oriented can.

FIGURE 10 is a fragmentary perspective view of an improperly oriented can, the can being shown in an inverted position so that it may be illustrated oriented with respect to the blank and the properly oriented can of FIGURE 9.

Referring now to the drawings in detail, reference is first made to FIGURE 9 wherein there is illustrated a conventional rip strip can. The can is generally referred to by the numeral 15 and includes a can body 16 to which there has been secured at the bottom end thereof a can end 17 by means of a double seam 18. The can body 16 is of the decorated type and is provided with an electrically insulating coating 19 on a major portion thereof except immediately on opposite sides of the seam 20 thereof. This leaves an exposed electrically conductive area 21.

The can body 16 is provided at its upper end with a flange 22 to facilitate the closing of the can 15 by the application of a further end (not shown) in a conventional manner. The can 15 is also intended to have disposed in the upper portion thereof a conventional collar (not shown) which is retained in place in part by a circumferential bead 23 which projects outwardly. Immediately above the bead 23, the can body 16 is provided with a pair of circumferential score lines 24 which define a removable rip strip 25. The rip strip 25 terminates at one end in a projecting tab 26 to which a key (not shown) may be attached for effecting the opening of the can 15.

The can body 16 is formed in a conventional manner from an elongated blank which is passed through a conventional body maker wherein the blank is shaped to assume a cylindrical form and the free ends of the blank are joined together to form the seam 20. Thereafter, in a conventional manner the can end 17 is secured to the can body 16 at the end thereof remote from the rip strip 25. The resultant can is then passed through a conventional beader and the bead 23 is formed on the can body 16 in the position shown in FIGURE 9. This, however, is based upon the assumption that every can body 16 will be properly oriented at the time the can end 17 is applied thereto. However, in certain instances the can body 16 will be upside down when it passes into the end applying machine with the result that the end 17 is secured to the end of the can body 16 adjacent the rip strip 25, as is shown in FIGURE 10. When the can end 17 is applied to the wrong end of the can body 16, the bead 23 is then formed in the can body 16 remote from the rip strip 25 in that the position of the bead 23 is determined by the open end of the resultant can. For purposes of identification, the can shown in FIGURE 10 will be generally referred to by the numeral 27.

After a can has been formed to the extent shown in FIGURE 9, it is passed along a conveyor for further operations and at this time it is necessary to determine if the can body 16 was properly oriented at the time the can end 17 was applied thereto and the bead 23 formed therein. It is possible to determine the orientation of the can body 16 at the time the end 17 is applied thereto by detecting the position of the projecting tab 26. However, tabs project different distances on different cans and this has not always proven to be reliable for detection purposes.

In view of this, it is preferred to provide the can body 16 with a projection that will be available for detection should the can body 16 not be properly oriented at the time the end 17 is attached thereto and at the same time will in no way detract from the appearance of the final can 15 in that if the can body 16 is properly oriented at the time the beading thereof takes place, the projection will be absorbed into the bead. It is pointed out above that the can body 16 is formed from a flat blank. Such a blank is illustrated in FIGURE 8 and is referred to by the numeral 28. Only the left-hand portion of the blank is shown and it will be seen that the uncoated area 21 thereof is provided with an outwardly directed projection or bump 29 below the rip strip 25 and in alignment with the position of the bead 23 when the bead 23 is formed in the resultant can body 16.

The projection or bump 29 in no way interferes with the forming of the can body 16 in the conventional manner. Furthermore, it in no way interferes with the application of the can end 17 to the can body 16. When the can body 16 is properly oriented at the time can end 17 is applied thereto, the bead 23 will be formed adjacent the rip strip 25 and in alignment with the projection 29 to assure the absorption of the projection 29 into the bead 23. Thus, the provision of the projection or bump 29 in no way detracts from the appearance of the can 15. On the other hand, if the can end 17 is applied to the wrong end of the can body 16, when the bead 23 is formed, it will not be formed in alignment with the projection 29 and the projection 29 will remain, as is shown in FIGURE 10. Then when the cans 15 and 27 are fed through an orientation detecting device with the can end 17 disposed lowermost, the presence of the projection or bump 29 on an upside down can 27 will be detected and such a can may be discharged from the line of cans in a manner to be described hereinafter.

Referring now to FIGURE 1 in particular, it will be seen that there is illustrated a conveyor unit 30 which has incorporated therein a can orientation detection device. The conveyor unit 30 basically includes a primary conveyor belt 31 which is suitably supported by a pair of drums 39 of which only one is illustrated. Cans are delivered to the conveyor belt 31 from the right, as viewed in FIGURE 1, and are moved to the left thereby. The cans are moved by the conveyor belt 31 onto a pair of rails 32 disposed on opposite sides of the conveyor belt 31. The rails 32 have ramp portions 33 which lead up onto the upper surface of the rails 32 so that cans initially conveyed by the conveyor belt 31 are elevated above the conveyor belt 31. When the cans move up onto the rails 32, they are engaged by a secondary conveyor belt 34 which is disposed in a horizontal plane as opposed to the vertical plane of the conveyor belt 31. The conveyor belt 34 passes around a plurality of pulleys 35, 36 and 37 of which one is driven. Also, the conveyor belt 34 has a straight line run 38 which is disposed parallel to the conveyor belt 31 and which is determined by a guide 40. Cans engaged by the conveyor belt run 38 are forced into contact wth a bar unit, generally referred to by the numeral 41, and rolled along the bar unit 41 so that the cans, as they move along the rails 32, are rotated about a vertical axis.

The conveyor unit 30 is provided adjacent the terminal ends of the rails 32 with a discharge chute 42 for receiving rejected cans. In order to effect the rejection of cans, there is provided a suitable discharge gate 43 which is actuated by an electromagnetic device 44.

Referring now to FIGURE 2 in particular, it will be seen that the conveyor unit 30 includes a frame assembly formed by a pair of longitudinally extending angle members 45 which support a horizontally disposed bed plate 46. The bed plate 46 has an opening 47 for the passage of the conveyor belt 31 and the drum 39 therethrough. The bed plate 46 supports a pair of angle guide members 48 which are disposed on opposite sides of the path of movement of cans. The cans are supported for movement towards the conveyor belt 31 by means of a pair of support rails 49 which are mounted on longitudinally extending bars 50 directly supported by the bed plate 46.

The conveyor unit 30 also includes an upper guide 51 which engages an upper central portion of an associated can body 16. The guide 51 is carried by an angle member 52 which is supported at spaced intervals by upstanding brackets 53 which are secured to an associated one of the angle members 45. At this time it is pointed out that the other of the angle members 45 carries at spaced intervals upstanding brackets 54 which, as is best illustrated in FIGURE 6, terminate at upper ends in inwardly directed portions 55 which overlie the path of movement of the cans and which have secured to the undersides thereof a longitudinally extending holddown 56 for the purpose of restricting the upward movement of the cans.

Referring now to FIGURE 3 in particular, it will be seen that the rails 49 terminate in alignment with the ramps 33 of the rails 32 so that cans carried by the belt 31 readily move up the ramps 33 and onto the rails 32 so as to be spaced above the upper surface of the upper run of the conveyor belt 31.

Reference is now made to FIGURE 6 which is a sectional view through the conveyor unit 30 in the area of the bar unit 41. The bar unit 41 includes a plurality of spaced supports 57 which are suitably secured to the bed plate 46 and one of the angle members 45 by fasteners 58. Overlying the supports 57 and insulated relative thereto by means of insulation 60 is a lower bar 61. An upper bar 62 overlies the lower bar 61 and is spaced therefrom in insulated relation by means of insulation 63. The bar 61 is positioned a distance above the upper surface of the rails 32 to be in alignment with a projection 29 should one exist. The inner face of the bar 61 is recessed outwardly from the inner face of the bar 62 a distance whereby a can body 16 rolling on the bar 62 will have the projection 29 carried thereby come into contact with the bar 61.

It is also pointed out at this time that the guide 40 for the run 38 of the conveyor belt 34 is supported by a pair of angle members 64 and 65 which are supported from the right-hand angle guide 48. The relationship of the conveyor belt run 38 with respect to the bars 61 and 62 is such to assure the desired contact between a can body 16 and the bars 61 and 62. It will be seen that when the conveyor belt run 38 moves longitudinally of the bed plate 46, the cans will ride and roll along the bar 62 while sliding and twisting along the rails 32. The bars 61 and 62 will be of sufficient length whereby a can body 16 moving therealong will complete at least one full revolution so that if a projection 29 does exist and is aligned with the bar 61, it will come in contact therewith.

It is readily understandable that the bar 61 may be a contact of an electrical circuit and a can body being detected may be part of the electrical circuit for the moment that a projection 29 thereof is engaged with the bar 61. The engagement of the projection 29 with the bar 61 may complete an electrical circuit to the electromagnetic device 44 in a manner to be described hereinafter. The electromagnetic device 44, through suitable linkage 66, serves to swing the discharge gate 43 into the path of cans carried by the conveyor belt 31 and force the same down the discharge chute 42. A return spring 67 is provided to assure the return of the discharge gate 43 to an inoperative position. It is readily apparent that if the apparatus gets out of adjustment or the contact surfaces are not maintained clear there will be times that the electrical circuit for the electromagnetic device will not function. When this happens, even though a can body was improperly oriented at the time the can end was applied thereto and the can body being detected has a projection 29 which should normally contact the bar 61, the electromagnetic device 44 will not operate to discharge the improperly formed can. Accordingly, it is necessary to periodically test the detection apparatus to determine whether it is functioning properly. To this end, test cans having upper and lower ends are inserted in the line of cans to make certain that the detection unit is functioning. This, however, has posed a difficulty in that when the detection unit is not functioning, the test can continues along the line with the other cans and must be retrieved. This is difficult to do in a fast moving line of cans. Accordingly, the conveyor unit 30 is provided with a second detection unit to assure the detection of test cans and the removal thereof from the line of cans.

The second detection unit includes a star wheel 68 that is carried by a shaft 69 depending from a support 70 and suitably rotatably journaled therein. The support 70 is carried by a suitable support bracket 71 which projects upwardly from the frame of the conveyor unit 30. In order to assure that the star wheel 68 does not override and is moved solely in accordance with the movement of cans thereby, there is provided an escapement mechanism, generally referred to by the numeral 72. The escapement mechanism 72 includes a fitting 73 which is suitably adjustably secured to the underside of the plate 70 by means of fasteners 74. The fitting 73 carries an upstanding shaft 75 on which a bracket 76 is mounted for rotation. The bracket 76 has a first arm 77 and a second arm 78 extending therefrom in angular relation. The arm 77 includes a depending end portion 80 which projects into the path of the star wheel 68 and limits the rotation thereof as each can passes thereby. The arm 78 has a rounded portion 81 for engagement by cans to effect the rotation of the bracket 76 in a counterclockwise direction and to move the depending portion 80 of the arm 77 out of the path of movement of the star wheel 68. A return spring 82 urges the bracket 76 in a clockwise direction and a suitable stop (not shown) is provided for limiting the clockwise movement of the bracket 76 to the position shown in FIGURE 4.

A switch 83 is suitably mounted in an adjustable position on the opposite surface of the plate 70 by means of fasteners 84. The switch 83 is provided with a plunger type operator 85. The switch 83 is provided with a mounting bracket 86 which supports an elongated arm 87 carrying a cam follower 88. The arm 87 has connected thereto a shorter arm 89 which is aligned with the plunger 85 and which serves to depress the plunger 85 to close the contacts (not shown) of the switch 83. The opening and closing of the switch 83 is controlled by means of a cam 90 mounted on the upper end of the shaft 69 and against which the cam follower 88 rides. The cam 90 is so oriented with respect to the star wheel 68 so that when a can is aligned with the shaft 69, the switch 83 is closed and the circuit of which the switch 83 is a part is completed.

The plate 70 also carries a mounting bracket 91 which, in turn, has adjustably secured to the underside thereof an insulated block 92 which is mounted for adjustment by means of fasteners 93. The insulated block 92 has secured to the underside thereof a spring contact finger 94 which includes a downwardly projecting portion 95 adapted to project into the interior of a can and engage a can end when the upper end of the can is provided with such an end to complete an electrical circuit leading to the electromagnetic device 44. It is to be noted that the depending portion 95 is contoured for riding into and out of a can without damaging the same.

At this time it is also pointed out that the plate 70 is additionally supported by a bracket 96 which is secured to the underside of the plate 70 by means of fasteners 97. The bracket 96 is secured to the frame of the conveyor unit 30 in any desired manner.

Reference is now made to FIGURE 7 wherein it will be seen that the electrical system of the two detection units includes a primary wire 100 and a ground wire 101 which are connected to a source of electrical current. The first detection unit, which includes the detector bar 61, is provided with a control unit generally referred to by the numeral 102. The control unit 102 is of the conventional type and is referred to commercially as an electronic photoswitch. The particular model utilized is Type 22DJ2, Model 1003, Series 62C, manufactured by Photoswitch Division of Electronics Corporation of America at Cambridge, Massachuetts. The photoswitch 102 has coupled thereto two input wires 103 and 104 which are connected to the wires 100 and 101, respectively. The wire 103 has incorporated therein a manually actuated control switch 10. In order to indicate that the photoswitch 102 is energized, there is connected to the wire 103 intermediate the switch 105 and the photoswitch 102 a wire 106 which leads to a signal light 107. The signal light 107 is connected to the wire 101 by means of a wire 108.

The photoswitch 102 is provided with conventional terminals F and S to which there are connected wires 109 and 110, respectively. The wire 109 is connected to the detector bar 61 and the wire 110 is connected to the wire 101. There is also connected to the photoswitch 102 wires 111 and 112 which are connected to the electromagnetic device 44 and a switch element of a second electronic photoswitch which is identical with the photoswitch 102 and which is generally referred to by the numeral 113. In addition, there is a wire 114 leading from the photoswitch 102 and connected to a wire 115 which leads from the photoswitch 113 and which corresponds to the wire 104, the wire 115 being connected to the wire 101. The circuit for the detection unit of which the photoswitch 102 is a part is completed by means of a wire 116 which extends between the wire 101 and one of the rails 32. The entire system is grounded by grounding the wire 101 as at 117.

It will be apparent that when a can moving along the rails 32 was improperly oriented at the time the can end 117 was applied thereto, the projection 29 will remain as an individual projecting part of the can body 16 and will engage the detector bar 61. Since the can is riding on the rails 32, it will be readily apparent that the can will bridge between the wires 109 and 116 and complete the circuit to the photoswitch 102, thus effecting the movement of a dual adjustable time delay controlled switch element 118 thereof to a closed position for the pre-selected time interval completing the circuit to the electromagnetic device 44 and effecting the movement of the gate 43 to a can discharge position. It is to be understood that by means of the pre-selected time interval during which the dual switch element 118 is closed the gate 43 will be in a can discharge position for the movement of several cans and in this manner the defective can will be discharged. The discharged cans may be inspected and the cans which should not have been discharged may be manually placed back in the line.

The photoswitch 113, in addition to receiving current flow through the wire 115, receives current flow through a wire 120 connected to the wire 100. The photoswitch 113 has terminals F and S to which there are connected wires 121 and 122, respectively. The wire 122 is connected to the wire 101 while the wire 121 is connected to the switch 83. The wire 112 leads to a double adjustable time delay controlled switch element, generally referred to by the numeral 123, which is similar to the double switch element 118, but is of a slightly different construction. A wire 124 leads from the double switch element 123 of the photoswitch 113 to the wire 111 and has incorporated therein a signal light 125. Since the part of the switch element 123 to which the wires 112 and 124 are connected is normally closed, it will be seen that when the switch element 118 is moved to a closed position indicating a defective can, the light 125 will be energized to signal this. There is also connected to the double switch element 123 a wire 126 which leads to the wire 111 and energizes the electromagnetic device 44 when a circuit is completed through the spring contact 94 and a can having the upper end thereof closed by an end. Thus, when either a test can, which has both ends closed, or a can having the upper end closed passes beneath the spring contact finger 94, the photoswitch 113 is energized to control the energization of the electromagnetic device 44 in the operation of the discharge gate 43.

It is to be understood that the test can will be similar to the can of FIGURE 10 except, as is clearly shown in FIGURE 6, it is provided with both upper and lower ends 17. Therefore, when the test can, which is generally referred to by the numeral 140, is placed in the conveyor unit 30, it will cause energization of the photoswitch 113 and the operation of the discharge gate 43. However, if the light 125 is not illuminated, at the time the discharge gate 43 is moved to a can discharging position due to the energization of the switch unit 123, then there is an indication that the circuit of which the photoswitch 102 is a part is not properly functioning. On the other hand, if this circuit is not properly functioning, the test can will not be lost.

It is also pointed out that although the projection of bump 29 has a beneficial effect, the detector bar 61 could be so positioned for engaging the projecting tab 26 of the rip strip 25. Furthermore, it is to be understood that this invention is not restricted to the detection of improperly oriented cans, but may be utilized in determining the orientation of other metal objects, particularly different types of containers. It will also be readily apparent that although the primary purpose of the second detection unit, which includes the photoswitch 113, is to detect and retrieve test cans, it will also detect and remove cans which are properly constructed but which have been supplied to the conveyor unit 30 in an inverted position.

Although only a preferred embodiment of the invention has been specifically illustrated and disclosed herein, it is to be readily apparent that minor variations may be made therein within the spirit and scope of the invention, as defined by the appended claims.

I claim:

1. A container conveyor, first means disposed along said conveyor for detecting an improperly oriented container, a container discharge mechanism operatively coupled with said detecting means, and second means for detecting a test container placed on said conveyor to test said first detecting means and operating said discharge mechanism independently of said first detecting means if said first detecting means fails to detect said test container.

2. A container conveyor, first means disposed along said conveyor for detecting an improperly oriented container, a container discharge mechanism operatively coupled with said detecting means, and second means for detecting a test container placed on said conveyor to test said first detecting means and operating said discharge mechanism independently of said first detecting means if said first detecting means fails to detect said test container, said second detecting means including a container operated timing device.

3. A container conveyor, first means disposed along said conveyor for detecting an improperly oriented container, a container discharge mechanism operatively coupled with said detecting means, and second means for detecting a test container placed on said conveyor to test said first detecting means and operating said discharge mechanism independently of said first detecting means if said first detecting means fails to detect said test container, said second detecting means including a container end detector.

4. A container conveyor, first means disposed along said conveyor for detecting an improperly oriented container, a container discharge mechanism operatively coupled with said detecting means, and second means for detecting a test container placed on said conveyor to test said first detecting means and operating said discharge mechanism independently of said first detecting means if said first detecting means fails to detect said test container, said second detecting means including a container-end engaging contact of the spring finger type, and a circuit completing switch connected to said contact, said switch having a container actuated operator for closing said switch only when a container is aligned with said contact.

5. A container conveyor, first means disposed along said conveyor for detecting an improperly oriented container, a container discharge mechanism operatively coupled with said detecting means, and second means for detecting a test container placed on said conveyor to test said first detecting means and operating said discharge mechanism independently of said first detecting means if said first detecting means fails to detect said test container, said second detecting means including a container end engaging contact of the spring finger type, and a circuit completing switch connected to said contact, said switch having a container actuated operator for closing said switch only when a container is aligned with said contact, said container actuated operator including a star wheel disposed in the path of containers and operable thereby, and a cam driven by said star wheel.

6. The structure of claim 5 wherein an escapement mechanism is cooperatively associated with said star wheel.

7. A conveyor system for use with a container orientation detection device, said conveyor system comprising a primary conveyor belt having an upper run for supporting and conveying containers, a pair of rail means for elevating and supporting containers along an intermediate portion of said primary conveyor belt upper run out of contact with said upper run, and a secondary conveyor belt having a run alongside the path of container movement and engageable with container side wall portions to rotate and move containers along said rail means.

8. A container orientation detector comprising a conveyor system including a primary conveyor belt having an upper run for supporting and conveying containers, a pair of rail means for elevating and supporting containers along an intermediate portion of said primary conveyor belt upper run out of contact with said upper run, a secondary conveyor belt having a run alongside the path of container movement and engageable with container side wall portions to rotate and move containers along said rail means, and a pair of detection rails generally opposing said secondary conveyor belt run.

9. A container orientation detector comprising a conveyor system, a discharge device disposed alongside said conveyor system for removing improperly oriented containers therefrom, first detecting means for detecting peripheral projections on containers, second detecting means for detecting the presence of container ends, and means connecting said first and second detecting means to said discharge device for independently operating the same, a primary conveyor belt having an upper run for supporting and conveying containers, a pair of rails for elevating and supporting containers along an intermediate portion of said primary conveyor belt upper run, and a secondary conveyor belt having a run alongside the path of container movement and engageable with container side wall portions to rotate and move containers along said rails.

10. A container orientation detector comprising a conveyor system, a discharge device disposed alongside said conveyor system for removing improperly oriented containers therefrom, first detecting means for detecting peripheral projections on containers, second detecting means for detecting the presence of container ends, and means connecting said first and second detecting means to said discharge device for independently operating the same, a primary conveyor belt having an upper run for supporting and conveying containers, a pair of rails for elevating and supporting containers along an intermediate portion of said primary conveyor belt upper run, and a secondary conveyor belt having a run alongside the path of container movement and engageable with container side wall portions to rotate and move containers along said rails, said first detecting means including a pair of detecting rails generally opposing said secondary conveyor belt run.

11. A container orientation detector comprising a conveyor system, a discharge device disposed alongside said conveyor system for removing improperly oriented containers therefrom, first detecting means for detecting peripheral projections on containers, second detecting means for detecting the presence of container ends, and means connecting said first and second detecting means to said discharge device for independently operating the same, a primary conveyor belt having an upper run for supporting and conveying containers, a pair of rails for elevating and supporting containers along an intermediate portion of said primary conveyor belt upper run, and a secondary conveyor belt having a run alongside the path of container movement and engageable with container side wall portions to rotate and move containers along said rails, said second detecting means including a container end engaging contact of the spring finger type, and a circuit completing switch connected to said contact, said switch having a container actuated operator for closing said switch only when a container is aligned with said contact.

12. A container orientation detector comprising a conveyor system, a discharge device disposed alongside said conveyor system for removing improperly oriented containers therefrom, first detecting means for detecting peripheral projections on containers, second detecting means for detecting the presence of container ends, and means connecting said first and second detecting means to said discharge device for independently operating the same, a primary conveyor belt having an upper run for supporting and conveying containers, a pair of rails for elevating and supporting containers along an intermediate portion of said primary conveyor belt upper run, and a secondary conveyor belt having a run alongside the path of container movement and engageable with container side wall portions to rotate and move containers along said rails, said first detecting means including a pair of detecting rails generally opposing said secondary conveyor belt run, said second detecting means including a container end engaging contact of the spring finger type, and a circuit completing switch connected to said contact, said switch having a container actuated operator for closing said switch only when a container is aligned with said contact.

References Cited by the Examiner

UNITED STATES PATENTS

| | | | |
|---|---|---|---|
| 1,266,666 | 5/1918 | Dillon | 209—72 X |
| 2,400,507 | 5/1946 | Henszey et al. | 209—88 X |
| 2,606,657 | 8/1952 | Berthelsen | 209—74 |
| 2,866,548 | 12/1958 | Simpson et al. | 209—72 |
| 2,987,180 | 6/1961 | Shields | 209—90 |
| 3,018,886 | 1/1962 | Matejek | 209—72 |
| 3,096,575 | 7/1963 | Cook | 221—156 X |
| 3,235,075 | 2/1966 | Stetter | 209—81 |

M. HENSON WOOD, Jr., *Primary Examiner.*

C. H. SPADERNA, A. N. KNOWLES,
*Assistant Examiners.*